United States Patent
Strobel

(10) Patent No.: US 9,922,468 B2
(45) Date of Patent: Mar. 20, 2018

(54) METHOD AND MONITORING SYSTEM FOR MONITORING THE USE OF CUSTOMER FUNCTIONS IN A VEHICLE

(71) Applicant: Bayerische Motoren Werke Aktiengesellschaft, Munich (DE)

(72) Inventor: Christina Strobel, Munich (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 190 days.

(21) Appl. No.: 14/705,326

(22) Filed: May 6, 2015

(65) Prior Publication Data

US 2015/0235483 A1    Aug. 20, 2015

Related U.S. Application Data

(63) Continuation of application No. PCT/EP2013/072605, filed on Oct. 29, 2013.

(30) Foreign Application Priority Data

Nov. 7, 2012 (DE) .................. 10 2012 220 228

(51) Int. Cl.
   *G07C 5/00* (2006.01)
   *G07C 5/08* (2006.01)

(52) U.S. Cl.
   CPC ............. *G07C 5/008* (2013.01); *G07C 5/08* (2013.01)

(58) Field of Classification Search
   CPC combination set(s) only.
   See application file for complete search history.

(56) References Cited

U.S. PATENT DOCUMENTS

| 6,695,218 B2* | 2/2004 | Fleckenstein ......... F24F 11/006 165/214 |
| 8,694,328 B1* | 4/2014 | Gormley ............ G06Q 30/0621 705/1.1 |
| 2004/0044454 A1* | 3/2004 | Ross ................... B60R 16/0231 701/36 |
| 2007/0021876 A1 | 1/2007 | Isaji et al. |
| 2011/0063099 A1* | 3/2011 | Miller .................... G07C 5/085 340/439 |

(Continued)

FOREIGN PATENT DOCUMENTS

| CN | 1862227 A | 11/2006 |
| CN | 102167039 A | 8/2011 |
| DE | 44 10 985 A1 | 10/1995 |

(Continued)

OTHER PUBLICATIONS

International Search Report (PCT/ISA/210) dated May 21, 2014 with English translation (five pages).

(Continued)

*Primary Examiner* — Thomas G Black
*Assistant Examiner* — Ana D Thomas
(74) *Attorney, Agent, or Firm* — Crowell & Moring LLP

(57) ABSTRACT

A method is provided for monitoring the use of customer functions in a vehicle. The method includes the detecting of at least one transition of state of at least one control unit for at least one customer function. The method further determines an initial state and an end state of the vehicle and detects at least one use pattern for reaching the end state from the initial state.

10 Claims, 2 Drawing Sheets

(56) References Cited

U.S. PATENT DOCUMENTS

2013/0134730 A1* 5/2013 Ricci .................... G06F 9/54
                                                              296/24.34
2016/0086397 A1* 3/2016 Phillips ............... G07C 5/0808
                                                              701/32.4

FOREIGN PATENT DOCUMENTS

DE     10 2010 029 204 A1   11/2011
EP          0 675 018 A1   10/1995
WO  PCT/US2011/067830    *  11/2011  ............ B60W 50/08
WO    WO 2012/149118 A1   11/2012

OTHER PUBLICATIONS

Chinese Office Action issued in counterpart Chinese Application No. 201380054819.X dated Oct. 8, 2016 with English-language translation (nine (9) pages).

* cited by examiner

METHOD AND MONITORING SYSTEM FOR MONITORING THE USE OF CUSTOMER FUNCTIONS IN A VEHICLE

CROSS REFERENCE TO RELATED APPLICATIONS

This application is a continuation of PCT International Application No. PCT/EP2013/072605filed 10/29/2013 which claims priority under 35 U.S.C.§ 119 from German Patent Application No. 10 2012 220 228.5 filed Nov. 7, 2012the entire disclosures of which are herein expressly incorporated by reference.

BACKGROUND AND SUMMARY OF THE INVENTION

The present invention relates to a method for monitoring the use of customer functions in a vehicle as well as to a monitoring system.

Modern vehicles already contain a large number of customer functions of many different domains, such as comfort, infotainment, driver assistance, driving dynamics settings, personalization and the like. The number of functions will still likely rise in the future. These functions are only partially known to the driver because, as a rule, the operating instructions are not completely read and, because of the wealth of functions, are not all explicitly promoted. As a result of the multifunction allocation to key buttons, many functions cannot be operated by a dedicated operating element. For example, brief pressure on the locking button of the vehicle key will lock the vehicle, whereas long-lasting pressure will activate the comfort-closing function. In this case, the vehicle will be locked and, additionally, all opened windows and the sliding roof will be closed.

In order to familiarize the driver with the functions of the vehicle and, in particular, with the so-called customer functions, information control units are known which, when an operating element is activated, select and display from a memory the information pertaining to this operating element. Such an information control unit is described, for example, in German Patent document DE 44 10 985 A1.

It is a disadvantage of such an information control unit that the driver may possibly not learn further functions in his vehicle because he does not activate the corresponding operating element. In addition, the information supplied by the information control unit is useful only to the driver of the vehicle but not to third parties, such as the vehicle manufacturer.

It is therefore an object of the present invention to provide a solution by which information concerning customer functions in a vehicle can be made available in a simple manner for different uses.

The invention is based on the recognition that this object can be achieved in that, instead of a mere confirmation of a customer function, user behavior is taken into account.

According to a first aspect, the object is therefore achieved by a method for monitoring the use of customer functions in a vehicle which comprises the act of detecting at least one transition of state of at least one control unit of at least one customer function. The method is characterized in that the method further comprises at least the act of determining an initial state and an end state of the vehicle and the act of detecting at least one use pattern for reaching the end state from the initial state.

For the purpose of the present invention, a function of a customer function system, which is also called a domain, is a customer function. Examples of customer function systems are comfort functions, infotainment functions, driver assistance functions, driving dynamics settings, personalization functions and the like. The customer functions of these customer function systems are, for example, window raising, vehicle locking, station searches, navigation setting and the like. These customer functions are each triggered by a control unit and can be operated by way of this control unit. As a rule, an operating unit is provided between the driver of the vehicle and the control unit. The control units of several customer functions may also be combined. For the purpose of the invention, the driver will be the user of the vehicle and, in particular, of the customer functions. This may also be the front-seat passenger or car passenger.

According to the invention, the detection of at least one transition of state preferably takes place by a monitoring unit, which is also called a tracer. In this case, the monitoring unit does not intervene in the state of the customer function but detects the transition of state preferably by way of a monitoring interface. By means of the transition of state, which may also be called a change of state, of a control unit, the use of a customer function is indicated. When control units for several customer functions are combined into one control unit, the state of change of one of the customer functions is called a transition of state, which is monitored according to the invention; this means that the state of change of a control unit can always be assigned to a specific customer function.

According to the invention, the method for monitoring comprises the act of determining an initial state and an end state of the vehicle. In this case, the state of the individual control units of the customer functions in the vehicle at different stages are called the initial and end state of the vehicle. The initial state may, for example, represent the state of the customer functions when unlocking the vehicle, when starting the vehicle or when starting a customer function system, such as the navigation system. The end state may, for example, represent the state of the customer functions when locking the vehicle, when switching off the vehicle or when switching off a customer function system, such as the navigation system. In addition or as an alternative, an end state may, for example, also be determined by the expiration of a time period since the initial state. The initial state is preferably determined by the activating or starting of a customer function, and the end state is preferably determined by the end of the use of this customer function or the switching-off of the customer function or of the customer function system. In this case, the initial state and the end state can easily be detected by monitoring the changes of state of the customer functions.

According to the invention, the method further comprises the act of detecting at least one use pattern for reaching the end state from the initial state. In this case, individual actions by the driver and the resulting triggered states of change of the customer functions are called use patterns.

A number of advantages can be achieved in that, according to the invention, a use pattern is detected, which includes several changes of state of customer functions. On the one hand, instead of providing information concerning a single customer function to the driver, as takes place in the prior art, it becomes possible to provide the driver with information for reaching the desired end state. In addition, it becomes possible, as a result of the detection of use patterns, for vehicle manufacturers and providers of customer function systems to learn the user behavior and take the latter into account for the purpose of planning Preferably, an applied use pattern is established. Furthermore, at least one alternative use pattern with respect to the applied use pattern can preferably additionally be detected. An applied use pattern is the use pattern which is composed of the transition of states that were triggered by the driver's actions. An alternative use pattern is a use pattern that, as a result of other transition of states of a customer function or transition of states of another customer function or a combination thereof, lead from the same initial state to the same end state, which were present in the case of the applied use pattern. The alternative use patterns preferably are weighted; for example, the alternative use pattern most comfortable to the driver, will have the highest weighting.

By detecting the applied use pattern, details can be collected as to which customer functions with which state transitions are used by drivers. In addition, the detected applied use pattern may have the purpose of determining whether there are further alternative use patterns or whether the applied use pattern is the only possible use pattern.

Preferably, at least one alternative use pattern is, however, detected by means of the initial state and the end state. All use patterns concerning a specified initial state and a pertaining specified end state are preferably stored in the monitoring system. These use patterns may be stored in a databank. The use patterns are preferably stored in the vehicle and are connected with the monitoring unit for monitoring the use of customer functions. By reading the use patterns for a customer function or for several customer functions, it can be determined by a comparison with the applied use patterns whether alternative use patterns are in existence.

The detection of at least one use pattern alternative to the applied use pattern has the advantage that the driver can also be informed of customer functions that are not applied. In addition, the detection of alternative use patterns enables the vehicle manufacturer or provider of customer function systems to recognize use patterns that are not used and, thereby, if applicable, also customer functions that are not used. If it is determined during the detection that no alternative use pattern is in existence, this may also be useful to the vehicle manufacturer or provider.

According to an embodiment, the use pattern includes at least one state change on at least two customer functions of the vehicle. Compared to the mere use of individual customer functions, it thereby becomes possible to increasingly also use combinations of customer functions. Since, in the case of the method according to the invention, the state changes of control units are monitored, this can take place in a simple fashion. According to a further embodiment, the at least two customer functions are part of at least two different domains, i.e. customer function systems. This permits a monitoring and detection of use patterns that covers customer function systems. This results in a simplification for the driver and can supply additional information to the vehicle manufacturer or provider of customer function systems. If a driver, for example, always switches his radio before he locks the vehicle, these functionalities can be combined in a new use pattern and be offered in a new series.

According to an embodiment, a statistical evaluation is carried out by way of the detected use pattern or patterns. In the statistical evaluation, particularly the frequency of the application or non-application of a use pattern can be taken into account. In addition, a time factor can be considered in this case. It can thereby be detected whether a driver, who can also be called a user, is changing his behavior.

According to an embodiment, an applied use pattern, which was detected, is stored and/or transmitted to at least one external unit. The use pattern or a result obtained from the evaluation of the use pattern can be stored in the monitoring system, particularly the vehicle. There, the applied use pattern can be available for further evaluations of subsequently detected applied use patterns.

In this context, according to the invention, the transmission of the use pattern itself and/or the transmission of a result obtained from the evaluation of the use pattern is called a transmission to an external unit. The external unit may, for example, be a computer or a databank of the vehicle manufacturer or of a provider of customer functions.

Because of the fact that the detected applied use pattern is stored and, as required, transmitted, it can serve for the evaluation of further use patterns and, as required, for the planning and design of further vehicles and customer function systems.

So far, an analysis of the use of customer functions has taken place either in especially equipped test vehicles or by means of customer surveys. The analyzing units are implemented separately per customer function and are usually part of the customer function itself. By means of methodes known so far, it therefore requires high expenditures to collect customer-related and statistically informative data concerning the use of customer functions. In particular, it is difficult to judge which customer functions are in fact used by the customer. This, in turn, makes the decision difficult as to which customer functions have to be more explicitly promoted in the future or should be installed at all. These disadvantages can be eliminated by use of the method according to the invention.

According to an embodiment, at least one piece of information concerning at least one alternative use pattern is output in the vehicle. In this context, a visual display or acoustic information is called an output. The information concerning the at least one alternative use pattern preferably is information concerning a preferred alternative use pattern. In this case, particularly a use pattern that increases the driver's comfort is indicated to be preferred. The information concerning the use pattern may be a reference to the use pattern or preferably information from operating instructions of the vehicle concerning the use pattern, particularly a preferred use pattern. Since the alternative use pattern was not used by the driver, this information provides the driver with the knowledge of a series of functions which are either hidden in submenus or can be operated only by the special operation of key buttons. Particularly when purchasing a used car, the customer often does not know precisely which functions are installed in his vehicle. The customer therefore pays for functions he does not know. It depends on the dealer whether these functions are shown to the customer. These disadvantages can be eliminated by use of the method according to the invention and, in particular, by use of the output of information concerning an alternative use pattern, particularly a preferred use pattern.

According an embodiment, the state monitoring of at least one control unit takes place by at least one monitoring unit by way of a bus communication or by way of a radio interface. As a result, on the one hand, the monitoring unit can monitor customer functions from different customer function systems and, on the other hand, a changing of the information system in the vehicle will not be necessary. Customer functions of a single customer function system can also be monitored in a simple manner by way of a communication bus or a radio interface.

According to a further aspect, the invention relates to a monitoring system for monitoring the use of customer functions in a vehicle. The monitoring system is characterized in that the monitoring system includes at least one monitoring unit for detecting at least one state transition of at least one control unit of at least one customer function, for determining an initial state and an end state of the vehicle and for detecting at least one use pattern for reaching the end state from the initial state.

The detecting of at least one state transition of at least one control unit of at least one customer function, the determining of an initial state and an end state of the vehicle and the detecting of at least one use pattern for reaching the end state from the initial state can be implemented by a single monitoring unit. However, according to the invention, several monitoring units may also be provided which communicate with one another. According to the invention, the monitoring unit is also called a tracer.

According to a preferred embodiment, the monitoring system further has at least one analysis unit for analyzing and, preferably, for statistically evaluating at least one use pattern.

The monitoring system according to the invention preferably has control units for implementing the method according to the invention. For example, the monitoring unit has an interface for communicating with control units of customer functions of the vehicle.

Advantages and characteristics described relative to the method according to the invention—if applicable—correspondingly apply also to the monitoring system according to the invention and vice-versa.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
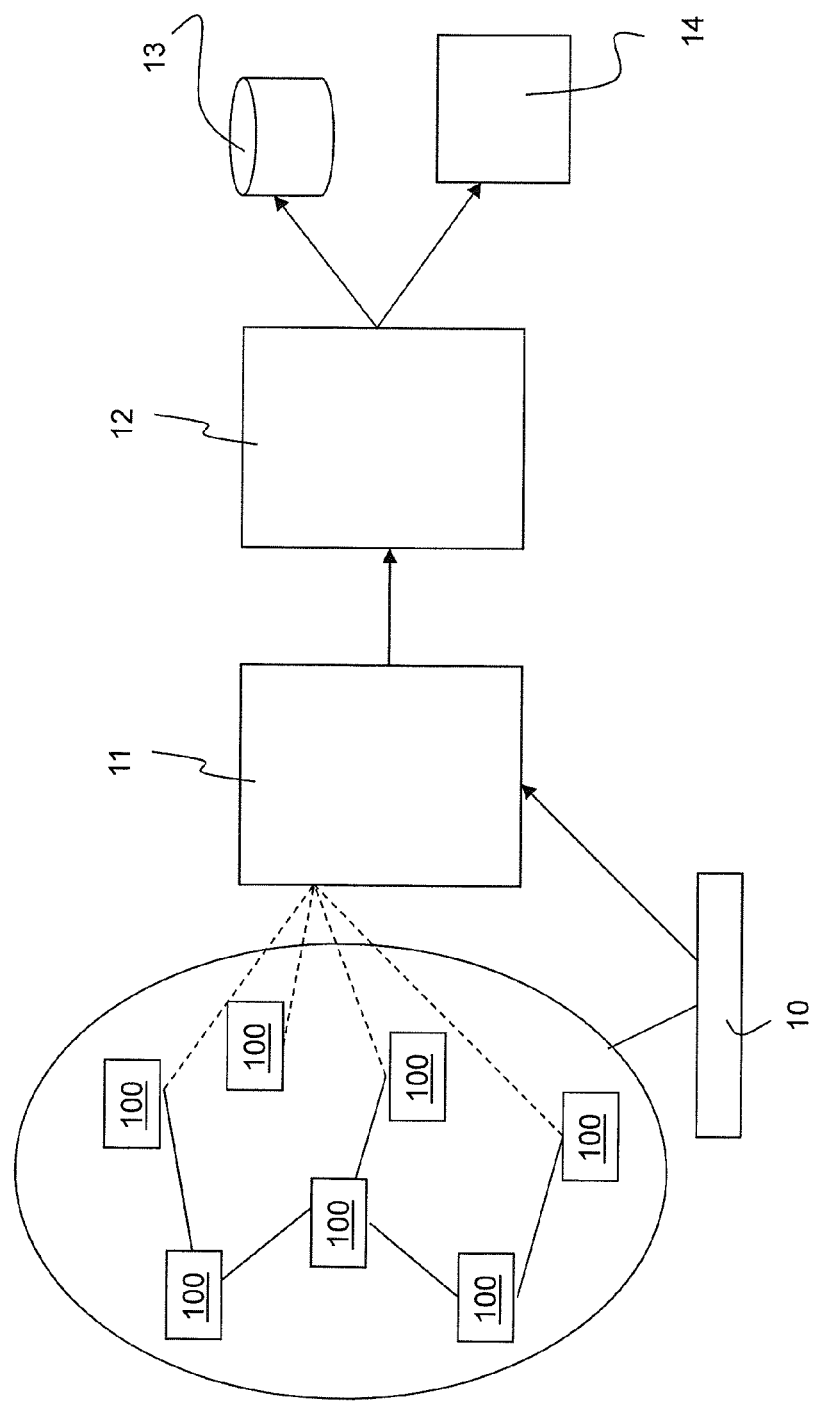
FIG. 1 is a schematic block diagram view of an embodiment of a monitoring system according to the invention.
Figure 2:
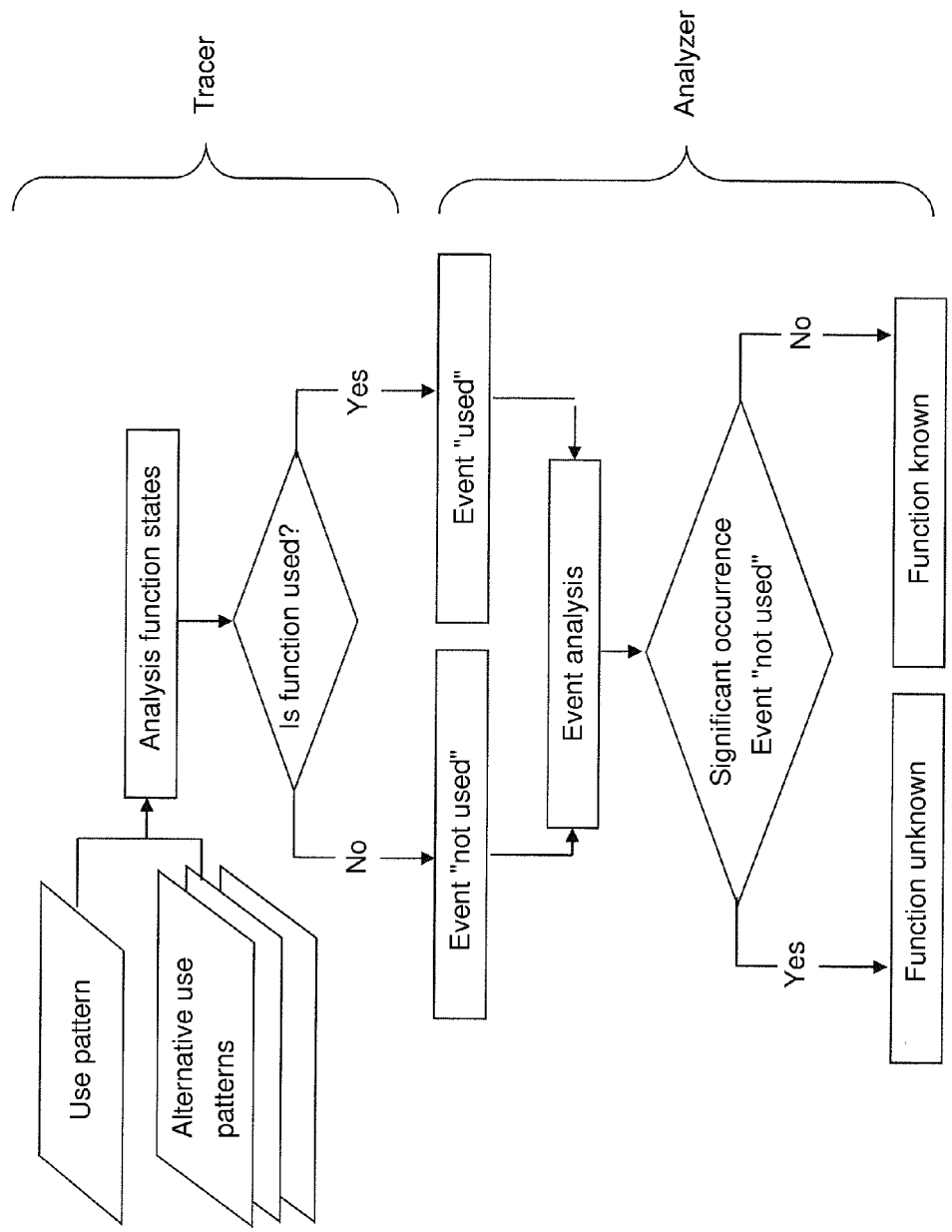
FIG. 2 is a schematic flow chart of an exemplary method according to the invention.

FIG. 1 illustrates electronic control units 100 in a vehicle, which are also called ECUs. One or more control units 100 are monitored by a monitoring unit 11, also called a tracer. The tracer 11 is supplied with a specification of conceivable use patterns by a customer function 10. The conceivable use patterns may, however, also be made accessible to the tracer 11 in a different fashion.

By use of this monitoring system, a method according to the invention can be implemented, which can be used in the vehicle independently of the concrete customer function 10. The method is parametrized only by way of the specification of use patterns. In particular, the method is the same for different domains or customer function systems, i.e. the method is independent of the comfort function, the driver assistance system (FAS) and the like. As illustrated in FIG. 1, the vehicle monitors the state of the control units 100 of a customer function 10 by means of the use patterns and recognizes therefrom the application or non-application of a customer function 10. The tracer 11 forwards these events together with a timestamp to the analyzing unit 12, the so-called analyzer.

The analyzer 12 analyzes the individual events and checks whether use patterns are applied with sufficient statistical significance which deviate from alternative and, in particular, from preferred use patterns. In this case, particularly time sequences are to be taken into account which indicate that the driver is changing his behavior. Thus, it is to be recognized, for example, whether use patterns at the beginning or at the end of the use period were observed particularly frequently. This indicates that the driver intentionally no longer uses the customer function or has started to intentionally use the customer function. The results determined in the analyzer can be transmitted to an external unit 13, 14. This unit may, for example, be a databank or a computer 13 of a vehicle manufacturer or provider of a customer function system. As an alternative or in addition, the results of the analyzer 12 or information that was determined on the basis of these results, such as information from operating instructions, are transmitted to an external unit, which represents a display control unit 14 or other output unit, and are thereby outputted to the driver of the vehicle.

The tracer 11 is a component that is independent of the concrete customer function and monitors the state of the customer function 10. In this case, the tracer 11 does not intervene in the function state but only has a monitoring interface to the function, such as a bus communication or a radio interface. As the input, the tracer 11 receives the specification of one or more use patterns. Preferably, at least one preferred use pattern is made available at the tracer 11. If the preferred use pattern is not used by the driver, the preferred use pattern will represent an alternative use pattern. Optionally, several alternative use patterns may be indicated.

The applied use pattern describes state transitions, as they occur in situations in which the customer function is used. The alternative use patterns describe state transitions for the same situation in which, however, a combination of other customer functions is used which should also be utilized. This means that the use patterns and alternative use patterns describe different state transitions from the same initial state to the same end state.

The invention can be described as follows by means of an embodiment. In the initial state, a driver is sitting in the vehicle and, of all windows and the sliding roof, two are open, for example. The driver leaves the vehicle with the goal that the vehicle is locked and all windows as well as the sliding roof are closed. When the driver applies a use pattern which describes the combination of the function "close windows per key button in the door and then lock the vehicle per key", the use pattern describing the state transitions for the function of comfort closing, this is recognized as an applied use pattern. Since the windows in the vehicle can be closed by way of several key buttons, several use patterns may occur. When one of these use patterns is compared with a preferred alternative use pattern, which particularly describes the transition of states for the comfort closing function, the applied use pattern may be recognized as a non-application of the preferred use pattern.

The analyses of the determined or detected use patterns, according to the invention, preferably take place for each driver. In order to identify the driver, methods such as the key profile are applied.

The analyses are provided to conceivable acceptors per interface. Acceptors may be the man-machine interface (MMI) in the vehicle, analysis systems at dealers or backend systems. Thus, instructions for the not used customer function may be displayed to the driver in a fully automated manner, in that the analysis is, for example, coupled with the integrated operating instructions. Preferably, care should be taken in this case that instructions concerning the same customer function are not displayed several times. For this purpose, the analyzer is provided with a history of which instructions have already been issued.

Personalized suggestions that meet the demands can be made to the driver, as to how he can optimally use his vehicle. In contrast to a mere "suggestion system" without customer-related data, no unnecessary instructions are displayed to the driver, whereby the monitoring system becomes less obtrusive. The driver is guided to new functions, for which he will be willing to pay when he buys further vehicles.

Conclusions can also be drawn from the analysis as to which functions are not accepted by the driver and therefore no longer have to be present within the scope of future functions.

The method according to the invention makes it possible to determine whether or not a customer function is used. The implementation expenditures will therefore only occur once. Expenditures for carrying out user studies are reduced. A generic medium is provided to the individual customer functions for recording the use behavior, so that additional implementation expenditures for each customer function are eliminated.

The method according to the invention can analyze the use of customer functions, for example, during the drive, and forward the analysis to conceivable acceptors. The analysis takes place for identifying the customer functions that are not used.

LIST OF REFERENCE NUMBERS

1 Monitoring system
10 Customer function
100 Control unit (ECU)
11 Monitoring unit (tracer)
12 Analyzing unit (analyzer)

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for monitoring use of customer functions in a vehicle, the method comprising the acts of:
    detecting at least one state transition of at least one control unit for at least one customer function;
    determining an initial state and an end state of the vehicle;
    determining at least one use pattern by which a user of the vehicle may reach the end state beginning from the initial state, including detecting an applied use pattern used by the user and determining at least one alternative use pattern based on the applied use pattern;
    outputting, by at least one of a visual output and an audio output, at least one piece of information identifying the at least one alternative use pattern to allow the user to select the at least one alternative use pattern, wherein the at least one alternative use pattern includes a preferred use pattern identified based on a comfort level of the user.

2. The method according to claim 1, wherein
    the use pattern comprises at least one state change on at least two customer functions of the vehicle, which two customer functions are part of at least two different customer functions systems of the vehicle.

3. The method according to claim 2, further comprising the act of:
    statistically evaluating one or more detected use patterns.

4. The method according to claim 1, further comprising the act of:
    statistically evaluating one or more detected use patterns.

5. The method according to claim 3, further comprising the act of:
    storing and/or transmitting the applied use pattern to at least one external unit outside the vehicle.

6. The method according to claim 1, further comprising the act of:
    storing and/or transmitting the applied use pattern to at least one external unit outside the vehicle.

7. The method according to claim 1, wherein the at least one piece of information is information from an operator's manual of the vehicle.

8. The method according claim 1, wherein the act of detecting at least one state transition is carried out via a monitoring unit by way of a bus communication or a radio interface.

9. A monitoring system for monitoring use of customer functions in a vehicle, comprising:
    a monitoring unit configured to detect at least one state transition of at least one control unit for at least one customer function of the vehicle, wherein
    the monitoring unit determines an initial state and an end state of the vehicle,
    the monitoring unit detects at least one use pattern by a user of the vehicle for reaching the end state from the initial state, including detecting an applied use pattern used by the user and determining at least one alternative use pattern based on the applied use pattern, and
    the monitoring unit outputs at least one of a visual output and an audio output, including at least one piece of information identifying the at least one alternative use pattern to allow the user to select the at least one alternative use pattern, wherein the at least one alternative use pattern includes a preferred use pattern identified based on a comfort level of the user.

10. The monitoring system according to claim 9, further comprising:
    at least one analysis unit operatively coupled with the monitoring unit, the analysis unit statistically evaluating the detected at least one use pattern.

* * * * *